United States Patent Office 3,487,082
Patented Dec. 30, 1969

3,487,082
2,4 - DIAMINO - 6 - HALOPTERIDINES AND
PROCESSES FOR THEIR PREPARATION
Edward J. Cragoe, Jr., Lansdale, and James H. Jones, Blue
Bell, Pa., assignors to Merck & Co. Inc., Rahway, N.J.,
a corporation of New Jersey
No Drawing. Continuation-in-part of application Ser. No.
612,074, Jan. 27, 1967. This application Sept. 28, 1967,
Ser. No. 671,205
Int. Cl. C07d 57/28; A61k 27/00
U.S. Cl. 260—251.5          61 Claims

ABSTRACT OF THE DISCLOSURE 2,4-diamino-6-halopteridines which are optionally substituted at the 7-position are described. These compounds are prepared by condensation of a 3-amino-5-X-6-halopyrazinonitrile with guanidine to give a (3-amino-5-X-6-halopyrazinimidoyl)guanidine which cyclizes spontaneously to form the 2,4-diamino-6-halo-7-X-pteridine product. Several methods are described for the preparation of the starting 3-amino-5-X-6-halopyrazinonitriles. The products of this invention have utility as diuretic and/or saluretic agents and also exhibit antihypertensive properties.

This application is a continuation-in-part of copending U.S. application, Ser. No. 612,074 filed Jan. 27, 1967, now abandoned which in turn was a continuation-in-part of (a) applications 492,898 and 492,922 each of which was filed on Oct. 4, 1965, and now abandoned, as well as (b) applications 588,701, 588,736 and 588,752 each filed on Oct. 24, 1966, all now abandoned, the latter three applications themselves being continuation-in-part applications, respectively of applications 492,932, 492,937 and 492,903 each field Oct. 4, 1965, all now abandoned.

This invention is concerned with a novel method for preparing 2,4-diaminopteridine compounds having a halo substituent attached to the 6-position and being either unsubstituted or having a substituent of the type hereinafter described attached to the 7-position. The products produced by the novel method of this invention are themselves novel and constitute an additional feature of this invention.

In the past it has been impossible to produce 2,4-diaminopteridine compounds having a 6-halo substituent.

Surprisingly it was found by applicants that these novel and useful 6-halo substituted 2,4-diaminopteridine (I) compounds could be obtained by a novel process that involves reaction of a 3-amino-5-X-6-halopyrazinonitrile (III) with quanidine. During the reaction the acyclic product, (3-amino - 5 X - 6 - halopyrazinimidoyl)guanidine, (II) is formed but these intermediates generally are not isolated but rather generated and cyclized in situ to the 2,4-diamino-7-X-6-halopteridine (I)

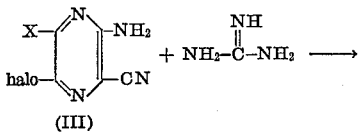

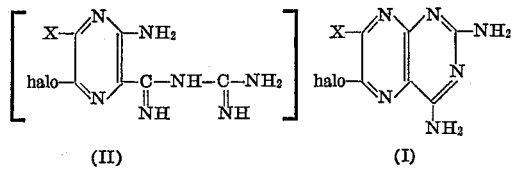

Guanidine is generated by treating a guanidine salt, such as guanidine hydrochloride, with an alkali metal salt of a lower alkanol advantageously a $C_{1-5}$ alkanol such as sodium ethoxide, sodium 2-propoxide or potassium tert.-butoxide advantageously in a solution of the corresponding alkanol. The 3-amino-5-X-6-halopyrazinonitrile can be added to this solution or the solvent can be removed by distillation first and the reaction conducted without a solvent or a different solvent can be added at this time. The reaction can be conducted at ambient temperature or at higher temperature such as the reflux temperature of the solvent which facilitates the cyclization of the acyclic intermediate (II) to the desired pteridine (I). When the reaction of a 3-amino-5-chloro(or bromo)-6-halopyrazinonitrile is conducted with a guanidine solution of a lower primary or secondary $C_{1-5}$ alkanol the 5-chloro(or bromo) is replaced by alkoxy and the corresponding 2,4-diamino-6-halo-7-alkoxypteridine is isolated. However, when a lower $C_{4-5}$ tert.-alkanol is used the 5-chloro(or bromo) group is uneffected and the 2,4-diamino-6-halo-7-chloro(or bromo)pteridine is obtained.

While an alcohol generally is employed as a solvent for the pyrazinonitrile and guanidine reactants, other solvents can be used in place of it such as p-dioxane, tetrahydrofuran, or highly polar solvents such as dimethylsulfoxide, sulfolane, dimethylformamide, N-methyl-2-pyrrolidinone as well as other polar solvents that would be readily apparent to a skilled chemist.

The preferred products produced by the novel process of this invention are 2,4-diamino-6-halo-7-X-pteridine wherein the 6-position halo is chloro, bromo or iodo and X is selected from
(1) hydrogen,
(2) halogen, especially chloro and bromo,
(3) hydroxy,
(4) lower aliphatic, especially lower alkyl as methyl, ethyl, propyl, butyl, amyl or any one of their branched chain isomers,
(5) lower alkoxy wherein the alkyl moiety can be one of the just described lower alkyl groups,
(6) phenyl-lower alkoxy,
(7) mercapto,
(8) lower alkylthio especially $C_{1-5}$ alkylthio,
(9) phenyl-lower alkylthio,
(10) phenyl,
(11) lower alkylphenyl especially mono, di- or tri-$C_{1-3}$ alkylphenyl,
(12) halophenyl having one to three halo substituents either all being the same or one or more dissimilar halogens selected especially from chloro, bromo and fluoro, or

(13) amino having the structure RR¹N— wherein
  (I) R is selected from the group consisting of
    (A) hydrogen,
    (B) lower alkyl,
    (C) lower alkenyl
  (II) R¹ is selected from
    (A) hydrogen,
    (B) amidino of the structure

wherein $R^2$ is selected from hydrogen and lower alkyl having from 1 to 3 carbons and $R^3$ is selected from hydrogen, lower alkyl and acyl especially lower alkanoyl or benzoyl,
    (C) 2-imidazolin-2-yl
    (D) mononuclear aryl (especially phenyl, or mono- or poly-substituted phenyl wherein the substitutents are selected from $C_{1-3}$ alkyl, $C_{1-3}$ alkoxy or halo wherein the halo is especially chloro, bromo or fluoro),
    (E) lower alkoxy ($C_{1-3}$),
    (F) lower alkenyl ($C_{3-5}$),
    (G) lower alkenyl ($C_{3-5}$),
    (H) lower cycloaliphatic having especially from 3 to 6 nuclear carbons as cyclopropyl, cyclobutyl, cyclopentyl and cyclohexyl,
    (I) lower alkyl,
    (J) substituted lower alkyl wherein the substituent group or groups are
      (1) halo, mono- or poly-, especially chloro, bromo or fluoro,
      (2) hydroxy and polyhydroxy,
      (3) lower alkoxy,
      (4) lower $C_{3-6}$ cycloalkyl of the type mentioned above,
      (5) mononuclear aryl or substituted mononuclear aryl [especially phenyl, mono- or poly-halo, lower alkyl and/or alkoxy-substituted phenyl],
      (6) heterocyclic especially 5 or 6 membered mono- or poly O- and/or N-containing heterocycles such as pyrrolidyl, pyridyl, furyl, tetrahydrofuryl, 2-imidazolin-2-yl, piperazinyl, lower-alkyl-piperazinyl, morpholino and the like,
      (7) amino having the structure $R^4R^5N-$ wherein $R^4$ is selected from the group consisting of (A') hydrogen, (B') lower alkyl especially $C_{1-5}$ alkyl, (C') lower alkenyl especially $C_{3-5}$ alkenyl, (D') acyl, especially lower alkanoyl and benzoyl, $R_5$ is selected from the group consisting of (A') hydrogen, (B') amidino of structure

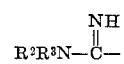

wherein $R^2$ and $R^3$ have the meaning given above, (C') 2-imidazolin-2-yl, (D') 1,4 - benzodioxan -6- yl, (E') mononuclear aryl especially phenyl or or mono- or poly-substituted phenyl wherein the substituent(s) is or are lower alkyl, lower alkoxy, and/or halo especially chloro, bromo and fluoro, (F') $C_{3-5}$ alkenyl, (G') $C_{3-5}$ alkynyl, (H') $C_{3-6}$ cycloalkyl, (I') $C_{1-5}$ alkyl, (J') substituted $C_{1-5}$ alkyl wherein the substituent(s) is or are (a) di-lower alkylamino, (b) hydroxy, (c) $C_{1-3}$ alkoxy, (d) $C_{3-6}$ cycloalkyl, (e) mononuclear aryl especially phenyl, (f) substituted phenyl especially with one or more lower alkyl, lower alkoxy and/or halo, especially chloro, bromo, fluoro,
      (g) heterocyclic especially a monocyclic heterocycle having from 5 to 7 members or a bicyclic heterocycle, each with one or more nitrogen and/or oxygen atoms as furyl, tetrahydrofuryl, pyridyl, 2-imidazolin-2-yl, piperidino, piperazinyl, 4-lower alkylpiperazinyl, morpholino, pyrrolidyl, 2-benzofuranyl, 2,3 - dihydro - 2-benzofuranyl, and the like, (K') acyl especially lower alkanoyl and benzoyl, and (L') $R^4$ and $R^5$ can form with the nitrogen to which they are attached a 5 or 6 membered heterocyclic structure or can form a poly O- and/or N-containing heterocyclic structure having 5 or 6 members, especially the piperazinyl, 4-lower alkylpiperazinyl, morpholino, pyrrolidyl, piperidino and the like,
  (III) when R and R¹ are alkyl they can be joined directly or through a nitrogen or oxygen hetero atom to form with the nitrogen to which they are attached a 5 to 6 membered heterocyclic structure thus forming, for example, 1-pyrrolidinyl, piperidino, morpholino, 1-piperazinyl, 4-lower alkyl-1-piperazinyl, and the like groups.

It has been found that the intermediate 3-amino-5-X-6-halopyrazinonitriles (III) can be prepared by the reactions illustrated graphically below:

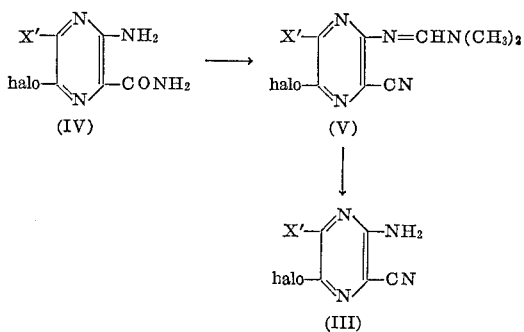

The 3-amino-5-X'-6-halopyrazinamide (IV) (where X' represents each of the X groups defined above except hydroxyalkyl, polyhydroxyalkyl, guanidino, aminoalkylamino and mono-substituted aminoalkylamino) upon treatment with either phosphoryl chloride or thionyl chloride in the presence of dimethylformamide, advantageously by warming forms the corresponding N,N-dimethyl-N'-(3-cyano-5-halo-6-X'-2 - pyrazinyl)formamidine (V), which can be hydrolyzed in the presence of a strong mineral or organic acid (such as hydrochloric, sulfuric, methansulfonic and the like acids) to produce the desired 3-amino-5-X'-6-halo-pyrazinonitrile (III).

It is to be recognized that if X' is amino in the starting amide (IV), in the intermediate (V) X' will be $N=CHN(CH_3)_2$ but in the product (III) will be amino since hydrolysis will involve both the 3- and the 5-substituents.

An alternate route to the 3-amino-5-RR¹N-6-halopyrazinonitriles (III–B) involves the reaction of one of the nitrile compounds made by the above method, namely a 3-amino-5-chloro(or bromo)-6-halopyrazinonitrile (III–A), with ammonia, a primary amine or a secondary amine.

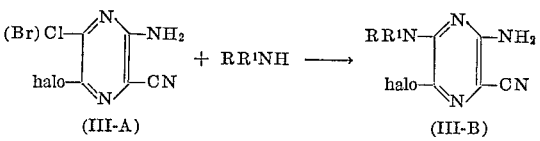

The reaction is advantageously conducted in a polar solvent, such as dimethylformamide, dimethyl sulfoxide, sulfolane, methylcellosolve, and the like. The reaction can be carried out at ambient temperature; however, it is advantageous to conduct the reaction at higher temperatures such as 50° C. to 120° C. for a period of from 10 minutes to 6 hours. When HNRR¹ is an aromatic amine it is preferred to employ an excess of the aromatic amine along with an equimolar quantity of the hydrohalide salt of the same aromatic amine.

This method has the advantage that the R and R¹ substituents can be the same as the R and R¹ groups described supra including the hydroxyalkyl, polyhydroxyalkyl, guanidino, aminoalkylamino and mono-substituted aminoalkylamino groups that cannot be made by the first method described above.

A further alternative procedure can be employed to prepare 3-amino-5-X-6-iodopyrazinonitriles (Compound III where halo is iodo). This method involves catalytic hydrogenolysis of 3-amino-5-X-6-chloro(or bromo)pyrazinonitrile using a palladium on charcoal catalyst in the presence of magnesium oxide to form the corresponding 3-amino-5-X-pyrazinonitrile. A solvent such as a lower alkanol is advantageous. Iodination of the 3-amino-5-X-pyrazinonitrile using iodine and mercuric acetate in a solvent such as aqueous p-dioxane or tetrahydrofuran preferably with heating at 50° C. to 100° C. for a period of 5 to 30 minutes produces the desired 3-amino-5-X-6-iodopyrazinontrile.

The 3-amino-5-X″-6-halopyrazinamide (IV–A) intermediates (where X″ represents each of the X groups described supra except lower alkoxy and lower-alkylmercapto) advantageously are prepared by the reaction of the appropriate alkyl 3-amino-5-X″-6-halopyrazinoate (VI) with amonia.

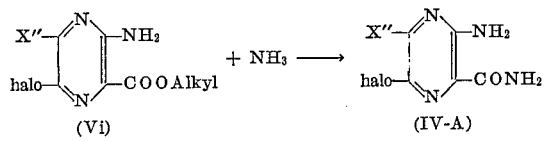

The reaction can be conducted using liquid ammonia at temperatures slightly below ambient temperature to slightly above ambient temperature. Alternatively, the ester can be dissolved in an inert solvent and ammonia gas admitted below the surface of the solution. With esters which have a 5-chloro or bromo substituent, lower temperatures and the use of liquid ammonia and a non-polar solvent favor the formation of the desired amide (IV–A) while higher temperatures and polar solvents favor the formation of 3,5-diamino-6-halopyrazinamide.

The 3-amino-5-X‴-6-halopyrazinamide (IV–B) intermediates (where X‴ represents lower alkoxy, lower alkylthio and RR¹N-groups except guanidino, aminoalkylamino and mono-substituted aminoalkylamino groups) can be prepared by the reaction of a 3-amino-5-chloro(or bromo)-6-halopyrazinamide (IV–C) with an appropriate reagent (VII).

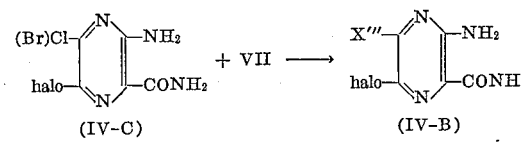

When the reagent (VII) is a lower alkanol (R′OH) or lower alkyl mercaptan (R′SH) and a base, such as triethylamino or pyridine in a solvent as dimethylformamide or dimethyl sulfoxide is used, the product is a 3-amino-5-lower alkoxy-(or lower alkylthio)-6-halopyrazinamide. The reaction also can be carred out using R′OM or R′SM where M is derived from an alkali metal. When R′OM is used, R′OH can be used as a solvent. When VII is RR¹NH (with the exception of guanidino, aminoalkylamino and mono-substituted aminoalkylamino groups) in a solvent such as dimethyl sulfoxide or dimethylformamide the product is the corresponding 3-amino-5-RR¹N-6-halopyrazinamide with the exceptions mentioned above. It is usually advantageous to conduct these reactions above ambient temperature, such as at 50° C. to the reflux temperature of the solvent.

The novel 2,4-diamino-6-halo-7-X-pteridine products of this invention possess diuretic and saluretic properties and are useful in the treatment of edema or other conditions, associated with an abnormal retention of fluid and/or electrolytes especially sodium and chloride ions. The pteridine compounds of this invention additionally exhibit antihypertensive properties and are therefore useful in lowering blood pressure in a hypertensive patient. As the products are effective upon oral or parenteral administration, they can be administered in any of the usual suitable dosage forms such as admixed with lactose and encapsulated and administered orally. Of particular importance are the 2,4-diamino-6-halo-7-(amino or substituted amino)-pteridine compounds and especially the pteridine compounds of this invention having the group $R^4R^5N$-alkyl-NR- attached to the 7 position, which possess marked antihypertensive, diuretic and/or saluretic properties. While the dosage will vary depending upon the age and condition of the patient and the particular product used, effective dosages ranging between about 20–800 mg. per day or more generally will produce the desired effect.

The novel methods for producing the pteridine products of this invention will be described in greater detail in the following examples which are to be considered illustrative.

EXAMPLE 1.—2,4-DIAMINO-6-CHLORO PTERIDINE

Step A.—Preparation of 3-amino-6-chloropyrazinamide

Methyl 3 - amino-6-chloropyrazinoate (25 g., 0.133 mole) is suspended in concentrated ammonium hydroxide (500 ml.) and then stirred and heated on a steam bath for an hour. The reaction mixture is cooled and the product removed by filtration, washed with water and dried. The yield of 3-amino-6-chloropyrazinamide is 20 g. (88%), M.P. 222–225° C. Recrystallization from a mixture of alcohol and water gives material melting at 231–232° C.

Analysis.—Calculated for $C_5H_5ClN_4O$: C, 34.80%; H, 2.92%; N, 32.47%. Found: C, 35.28%; H, 3.38%; N, 32.55%.

Step B.—Preparation of N,N-dimethyl-N′-(3-cyano-5-chloro-2-pyrazinyl)formamidine A suspension of 3-amino-6-chloropyrazinamide (17.2 g., 0.1 mole) in dimethylformamide (170 ml.) is treated with phosphoryl chloride (17 ml.) The temperature of the reaction mixture rises spontaneously, after which it is stirred for 10 minutes on a steam bath. After cooling the mixture is poured into ice-water (1 liter), and then neutralized with ammonium hydroxide. The yield of N,N-dimethyl - N′-(3 - cyano-5-chloro-2-pyrazinyl)formamidine is 14.2 g. (69%), M.P. 110–114° C. Recrystallization from cyclohexane gives material melting at 117–119° C.

Analysis.—Calculated for $C_8H_8ClN_5$: C, 45.83%; H, 3.84%; N, 33.41%. Found: C, 45.84%; H, 3.65%; N, 33.49%.

Step C.—Preparation of 3-amino-6-chloropyrazinonitrile

A solution of N,N - dimethyl-N′-(3-cyano-5-chloro-2-pyrazinyl)formamidine (4 g., 0.02 mole) in 5% aqueous hydrochloric acid (100 ml.) is heated on a steam bath for 10 minutes. A yellow solid separates during the heating. The reaction mixture is cooled and the 3-amino-6-chloropyrazinonitrile is separated by filtration, washed with water and dried. The yield is 2.8 g. (95%), M.P.

151–153° C. Recrystallization from cyclohexane gives pure material, M.P. 151–153° C.

*Analysis.*—Calculated for $C_5H_3ClN_4$: C, 38.86%; H, 1.96%; N, 36.25%. Found: C, 39.33%; H, 2.24%; N, 36.73%.

Step D.—Preparation of 2,4-diamino-6-chloropteridine

Sodium (920 mg., 0.04 g. atoms) is dissolved in methanol (50 ml.), guanidine hydrochloride (4.0 g., 0.043 mole) is added and the mixture refluxed under anhydrous conditions for 15 minutes. The mixture is cooled, filtered and 3-amino-6-chloropyrazinonitrile (2.0 g., 0.013 mole) is added and the mixture refluxed for 15 minutes. The yellow solid that separates is removed by filtration and dried. The yield is 1.9 g. (75%), M.P. 295° C. (dec.). The product is suspended in water (100 ml.), dissolved by the addition of the minimum amount of diluted hydrochloric acid and filtered. The filtrate is made basic to litmus paper by the addition of dilute ammonium hydroxide. The precipitated 2,4-diamino-6-chloropteridine is separated by filtration, washed with water, then with ethanol and dried; M.P. 295° C. (dec.).

*Analysis.*—Calculated for $C_6H_5ClN_6$: C, 36.66%; H, 2.56%; N, 42.75%. Found: C, 36.76%; H, 2.65%; N, 42.33%.

EXAMPLE 2.—2,4-DIAMINO-6-BROMOPTERIDINE

Step A.—Preparation of 3-amino-6-bromopyrazinonitrile 3-aminopyrazinonitrile (11.1 g., 0.0093 mode (is dissolved in acetic acid (92 ml.) by warming to 60° C. and a solution of bromine (16 g., 0.2 g. atom) in acetic acid (7 ml.) is added. The mixture is stirred for 15 minutes and then cooled and poured into ice water (300 ml.). The solid that separates is removed by filtration, washed with water and dried yielding 15.7 g. (85%) of product, M.P. 170–174° C. After recrystallization first from benzene and then from ethanol, the 3-amino-6-bromopyrazinonitrile melts at 181–183° C.

*Analysis.*—Calculated for $C_5H_3BrN_4$: C, 30.18%; H, 1.52%; N, 28.15%. Found: C, 30.44%; H, 1.69%; N, 28.40%.

Step B.—Preparation of 2,4-diamino-6-bromopteridine

Sodium (920 mg., 0.04 g. atom) is dissolved in methanol (35 ml.), guanidine hydrochloride (4.0 g., 0.043 mole) is added and the mixture refluxed for 30 minutes. After cooling and filtering, the filtrate is treated with 3-amino-6-bromopyrazinonitrile (2.0 g., 0.01 mole) and the mixture is refluxed for 30 minutes. The reaction mixture is cooled, diluted with water (75 ml.) and the solid removed by filtration; the yield is 1.2 g. (50%), M.P. >300° C. The solid is suspended in water (75 ml.) and the minimum amount of dilute hydrochloric acid added to effect solution. The solution is treated with decolorizing charcoal and filtered. The filtrate is made slightly basic to litmus paper with 5% sodium hydroxide and the precipitated 2,4-diamino-6-bromopteridine is separated by filtration, washed with water and dried, M.P. >300° C.

*Analysis.*—Calculated for $C_6H_5BrN_6$: C, 29.82%; H, 2.08%; N, 34.77%. Found: C, 30.29%; H, 2.45%; N, 34.58%.

EXAMPLE 3.—2,4-DIAMINO-6-IODOPTERIDINE

Step A.—Preparation of 3-amino-6-iodopyrazinonitrile

By replacing the methyl 3-amino-6-chloropyrazinoate of Example 1, Step A, by an equimolecular quantity of methyl 3-amino-6-iodopyrazinoate and following substantially the same procedure described in Step A of Example 1, there is obtained 3-amino-6-iodopyrazinamide. This product when treated with dimethylformamide and phosphoryl chloride, using equivalent quantities of reactants and substantially the same procedure described in Step B of Example 1 gives N,N-dimethyl-N'-(3-cyano-5-iodo-2-pyrazinyl)formamidine which when hydrolyzed with hydrochloric acid as described in Step C of Example 1 gives 3-amino-6-iodopyrazinonitrile.

Step B.—Preparaton of 2,4-diamino-6-iodopteridine

By replacing the 3-amino-6-chloropyrazinonitrile used in Step D of Example 1 by an equimolecular quantity of 3-amino-6-iodopyrazinonitrile and following substantially the same procedure described in Step D of Example 1 there is obtained 2,4-diamino-6-iodopteridine.

EXAMPLE 4.—2,4-DIAMINO-6,7-DICHLOROPTERIDINE

Step A.—Preparation of 3-amino-5,6-dichloropyrazinamide

A stainless steel autoclave is charged with methyl 3-amino-5,6-dichloropyrazinoate (11.1 g., 0.05 mole) and liquid ammonia (100 ml.) and is kept at 25° C. for 24 hours. The ammonia is expelled, and the product, rinsed from the autoclave with methanol (200 ml.). The methanol insoluble fraction (4.0 g.) was recrystallized from dimethylformamide (40 ml.) to give the pure 3-amino-5,6-dichloropyrazinamide which melted at 291.5–293.5° C.

*Analysis.*—Calculated for $C_5H_4Cl_2N_4O$: C, 29.07%; H, 1.95%; N, 27.06%. Found: C, 29.58%; H, 1.87%; N, 27.36%.

Step B.—Preparation of N,N-dimethyl-N'-(3-cyano-5,6-dichloro-2-pyrazinyl)formamidine A suspension of 3-amino-5,6-dichloropyrazinamide (22 g., 0.106 mole) in dimethylformamide (220 ml.) is stirred and treated with phosphoryl chloride (22 ml.). The temperature spontaneously rises to 65° C. after which it is heated to 80° C. and then stirred with heating for 10 minutes. The solution is cooled and poured into water (500 ml.) to give 12.5 g. (48%) of N,N-dimethyl-N'-(3-cyano-5,6-dichloro-2-pyrazinyl)formamidine, M.P. 116–118° C. After recrystallization from methylcyclohexane it melts at 117–119° C.

*Analysis.*—Calculated for $C_8H_7Cl_2N_5$: C, 39.35%; H, 2.89%; N, 28.70%. Found: C, 38.76%; H, 3.05%; N, 28.94%.

Step C.—Preparation of 3-amino-5,6-dichloropyrazinonitrile

A solution of N,N-dimethyl-N'-(3-cyano-5,6-dichloro-2-pyrazinyl)formamidine (2.5 g., 0.01 mole) in a solution of water (100 ml.) and 6 N hydrochloric acid (10 ml.) is stirred and heated on a steam bath for an hour. The mixture is cooled and the pale yellow solid recovered by filtration; the yield is 1.85 g. (95%), M.P. 213–215° C. After recrystallization from benzene the 3-amino-5,6-dichloropyrazinonitrile still melts at 213–215° C.

*Analysis.*—Calculated for $C_5H_2Cl_4N_4$: C, 31.74%; H, 1.06%; N, 29.64%. Found: C, 31.83%; H, 1.34%; N, 29.41%.

Step D.—Preparation of 2,4-diamino-6,7-dichloropteridine

Sodium (0.46 g., 0.02 g. atom) is dissolved in tert.-butanol (100 ml.), guanidine hydrochloride (1.91 g., 0.02 mole) is added and the mixture is refluxed for 30 minutes and then filtered. The tert.-butanol is removed from the filtrate and the residual guanidine is treated with 3-amino-5,6-dichloropyrazinonitrile (3.78 g., 0.02 mole). The reaction mixture is heated briefly at 60° C. to assure complete homogeneity and then stirred at room temperature for 2 hours. The addition of water (100 ml.) precipitates the product which is recovered by filtration, dried and purified by dissolving in dilute aqueous hydrochloric acid and precipitating with dilute aqueous sodium hydroxide. The product melts at >300° C.

*Analysis.*—Calculated for $C_6H_4N_6Cl_2$: C, 31.19%; H, 1.74%. Found: C, 31.53%; H, 2.09%.

EXAMPLE 5.—2,4-DIAMINO-6-BROMO-7-CHLOROPTERIDINE

Step A.—Preparation of methyl 3-amino-6-bromopyrazinoate 4-oxide

A solution of methyl 3-amino-6-bromopyrazinoate (4.6 g., 0.02 mole) and m-chloroperbenzoic acid (3.4 g., 0.02 mole) in chloroform (75 ml.) is refluxed for one hour, then chilled. The solid that separates is recovered by filtration and recrystallized from ethanol to yield 5.0 g. (98%) of methyl 3-amino-6-bromopyrazinoate 4-oxide, M.P. 200–202° C.

*Analysis.*—Calculated for $C_6H_6N_3O_3Br$: C, 29.05%; H, 2.44%; N, 16.94%. Found: C, 29.12%; H, 2.27%; N, 17.12%.

Step B.—Preparation of methyl 3-amino-5-chloro-6-bromopyrazinoate

Methyl 3-amino-6-bromopyrazinoate 4-oxide (2.0 g., 0.008 mole) is dissolved in dimethylformamide (20 ml.), phosphoryl chloride (2.0 ml.) is added and the reaction is stirred vigorously for 30 minutes and then poured into water (100 ml.). The clear solution deposits reddish crystals after standing for several hours, which are recrystallized from acetonitrile to yield 1.5 g. (71%) of methyl 3-amino-5-chloro-6-bromopyrazinoate, M.P. 225–228° C.

*Analysis.*—Calculated for $C_6H_5N_3O_2BrCl$: C, 27.04%; H, 1.89%; N, 15.77%. Found: C, 27.38%; H, 2.21%; N, 15.93%.

Step C.—Preparation of 3-amino-5-chloro-6-bromopyrazinonitrile

By replacing the methyl 3-amino-5,6-dichloropyrazinoate employed in Step A of Example 4 by equimolecular quantity of methyl 3-amino-5-chloro-6-bromopyrazinoate and then following the same procedures and using equivalent quantities of reactants described in Steps A through C of Example 4, there is produced successively 3-amino-5-chloro-6-bromopyrazinamide, N,N-dimethyl-N'-(3-cyano-5-bromo-6-chloro-2-pyrazinyl)formamidine and 3-amino-5-chloro-6-bromopyrazinonitrile.

Step D.—Preparation of 2,4-diamino-6-bromo-7-chloropteridine

This product is prepared following substantially the same procedure described in Example 4, Step D, except 3-amino-5-chloro-6-bromopyrazinonitrile is substituted for the 3-amino-5,6-dichloropyrazinonitrile.

EXAMPLE 6.—2,4-DIAMINO-6,7-DIBROMOPTERIDINE

Step A.—Preparation of methyl 3-amino-5,6-dibromopyrazinoate

By replacing the phosphoryl chloride used in Step B of Example 5 by an equal quantity of phosphoryl bromide and following substantially the same procedure described in Example 5, Step B, there is obtained methyl 3-amino-5,6-dibromopyrazinoate.

Step B.—Preparation of 2,4-diamino-6,7-dibromopteridine

By replacing the methyl 3-amino-5,6-dichloropyrazinoate employed in Example 4, Step A, by an equimolecular quantity of methyl 3-amino-5,6-dibromopyrazinoate and then using the same procedures and using equivalent quantities of reagents and reactants described in Example 4, Steps A through D, there is produced successively 3-amino-5,6-dibromopyrazinamide, N,N-dimethyl-N'-(3-cyano-5,6-dibromo-2-pyrazinyl)formamidine, 3-amino-5,6-dibromopyrazinonitrile, and thereafter 2,4-diamino-6,7-dibromopteridine.

EXAMPLE 7.—2,4-DIAMINO-6-CHLORO-7-BROMOPTERIDINE

Step A.—Preparation of methyl 3-amino-6-chloropyrazinoate 4-oxide

A suspension of methyl 3-amino-6-chloropyrazinoate (3.8 g., 0.02 mole) and m-chloroperbenzoic acid (3.4 g., 0.02 mole) in chloroform (50 ml.) is stirred at room temperature until a solution is obtained (15 minutes). Then the mixture is refluxed for one hour. The solid that separates upon cooling is recovered by filtration; the yield is 3.0 g. (75%). After crystallization from methanol the product melts at 200–202° C.

*Analysis.*—Calculated for $C_6H_6N_3O_3Cl$: C, 35.40%; H, 2.97%; N, 20.64%. Found: C, 35.71%; H, 3.14%; N, 20.82%.

Step B.—Preparation of methyl 3-amino-5-bromo-6-chloropyrazinoate

This product is prepared as described in Example 5, Step B; except that methyl 3-amino-6-bromopyrazinoate 4-oxide and phosphoryl chloride is replaced by an equimolecular quantity of methyl 3-amino-6-chloropyrazinoate 4-oxide and phosphoryl bromide.

Step C.—Preparation of 2,4-diamino-6-chloro-7-bromopteridine

This product is prepared following substantially the same procedure described in Example 1, Steps A–D, except the methyl 3-amino-6-chloropyrazinoate employed in Step A of Example 1 is replaced by an equimolecular quantity of methyl 3-amino-5-bromo-6-chloropyrazinoate. By following the procedures described in Steps A through D of Example 1 there is prepared successively 3-amino-5-bromo-6-chloropyrazinamide, N,N-dimethyl-N'-(3-cyano-5-chloro-6-bromo-2-pyrazinyl)formamidine, 3-amino-5-bromo-6-chloropyrazinonitrile, and 2,4-diamino-6-chloro-7-bromopteridine.

EXAMPLE 8.—2,4-DIAMINO-6-CHLORO-7-ISOPROPOXYPTERIDINE

Sodium (460 mg., 0.02 g. atom) is dissolved in isopropyl alcohol (50 ml.) and guanidine hydrochloride (1.91 g., 0.02 mole) then is added and the mixture is refluxed for 30 minutes. After cooling and filtering, the filtrate is treated with 3-amino-5,6-dichloropyrazinonitrile from Example 4, Step C, (2.0 g., 0.0106 mole). The mixture is stirred for 2 hours and then refluxed for 30 minutes. After cooling, the reaction mixture is poured into water (200 ml.) and the solid that separates is removed by filtration yielding 1.4 g. (52%) of 2,4-diamino-6-chloro-7-isopropoxypteridine, M.P. 233–235° C. (dec.). After recrystallization from benzene the product melts at 238–240° C.

*Analysis.*—Calculated for $C_9H_{11}ClN_6O$: C, 42.40%; H, 4.35%; N, 32.95%. Found: C, 42.65%; H, 4.25%; N, 33.23%.

EXAMPLE 9.—2,4-DIAMINO-6-CHLORO-7-METHOXYPTERIDINE

Step A.—Preparation of 3-amino-3-methoxy-6-chloropyrazinamide

Sodium (2.3 g., 0.1 mole) is dissolved in methanol (100 ml.) and the solution evaporated to dryness at reduced pressure. The solid sodium methoxide is dissolved in dimethylformamide and 3-amino-5,6-dichloropyrazinamide (20.7 g., 0.1 mole) (from Example 4, Step A) added, and the mixture stirred and heated on a steam bath for 30 minutes. The solvent is removed by distillation at reduced pressure and the residue suspended in water, filtered, washed with water and recrystallized from isopropyl alcohol.

Step B.—Preparation of 2,4-diamino-6-chloro-7-methoxypteridine

This product is prepared as described in Example 4,

Steps B through D, except the 3-amino-5,6-dichloropyrazinamide used in Step B is replaced by an equimolecular quantity of 3-amino-5-methoxy-6-chloropyrazinamide. By following substantially the same procedures described in Example 4, Steps B through D, there is obtained successively N,N - dimethyl-N'-(3-cyano-5-chloro-6-methoxy-2-pyrazinyl) formamidine, 3-amino-5-methoxy-6-chloropyrazinonitrile and 2,4-diamino-6-chloro-7-methoxypteridine.

2,4-diamino-6-chloro-7-benzylthiopteridine is prepared by the method described above in Example 9 except that an equivalent quantity of the sodium salt of benzyl mercaptan is substituted for sodium methoxide in Step A. Thus, the products produced, in order, are 3-amino-5-benzylthio-6-chloropyrazinamide,
N,N-dimethyl-N'-(3-cyano-5-chloro-6-benzylthio-2-pyrazinyl)formamidine,
3-amino-5-benzylthio-6-chloropyrazinonitrile, and
2,4-diamino-6-chloro-7-benzylthiopteridine.

Similarly, 2,4-diamino-6-bromo-7-ethylthiopteridine is prepared by essentially the same procedure described in Example 9, except that an equivalent quantity of the sodium salt of ethylmercaptan and an equivalent quantity of 3-amino-5-chloro-6-bromopyrazinamide (from Example 5, Step C) are substituted for the principal reactants recited in Step A of Example 9. Thus, the products produced, in order, are 3-amino-5-ethylthio-6-bromopyrazinamide,
N,N-dimethyl-N'-(3-cyano-5-bromo-6-ethylthio-2-pyrazinyl)formamidine,
3-amino-5-ethylthio-6-bromopyrazinonitrile, and
2,4-diamino-6-bromo-7-ethylthiopteridine.

EXAMPLE 10.—2,4-DIAMINO-6-IODO-7-METHOXYPTERIDINE

Step A.—Preparation of 3-amino-5-methoxypyrazinonitrile

A mixture of 3-amino-5-methoxy-6-chloropyrazinonitrile (12.9 g., 0.07 mole) (from Example 9), 5% palladium-on-charcoal catalyst (9 g.), magnesium oxide (4.0 g., 0.1 mole) and methanol (250 ml.) is shaken in an atmosphere of hydrogen for 10 hours at room temperature at an initial pressure of 30 p.s.i. The pressure drop indicates an absorption of 0.07 mole of hydrogen. The mixture is filtered and the solids extracted with boiling methanol and the combined filtrates are evaporated to dryness at reduced pressure. The residual 3-amino-5-methoxypyrazinonitrile is purified by recrystallization from a mixture of benzene and cyclohexane.

Step B.—Preparation of 3-amino-5-methoxy-6-iodopyrazinonitrile

A suspension of 3-amino-5-methoxypyrazinonitrile (14.9 g., 0.1 mole) in water (300 ml.) is heated to 70° C. Mercuric acetate (32 g., 0.1 mole) and a solution of iodine (25 g., 0.1 mole) in warm dioxane (200 ml.) is added quickly and the mixture is stirred and heated on a steam bath for 5 minutes then allowed to cool and treated with an aqueous solution of potassium iodide (500 ml. containing 75 g. of KI). The solid 3-amino-5-methoxy-6-iodopyrazinonitrile that separates is removed by filtration, washed with water and dried.

Step C.—Preparation of 2,4-diamino-6-iodo-7-methoxypteridine

By replacing 3-amino-5,6-dichloropyrazinonitrile of Example 4, Step D, by an equimolecular quantity of 3-amino-5-methoxy-6-iodopyrazinonitrile and following substantially the same procedure described in Example 4, Step D, there is obtained 2,4-diamino-6-iodo-7-methoxypteridine.

EXAMPLE 11.—2,4-DIAMINO-6-CHLORO-7-METHYLTHIOPTERIDINE

This compound is prepared as described in Example 9, Steps A and B, except that an equivalent quantity of the sodium salt of methyl mercaptan is substituted for sodium methoxide in Step A. Thus, the products obtained in order are 3 - amino - 5 - methylthio-6-chloropyrazinamide, N,N - dimethyl - N' - (3-cyano - 5 - chloro-6-methylthio - 2 - pyrazinyl)formamidine, - 3 - amino - 5-methylthio - 6 - chloropyrazinonitrile and 2,4 - diamino-6-chloro-7-methylthiopteridine.

EXAMPLE 12.—2,4-DIAMINO-6-CHLORO-7-ETHYLTHIOPTERIDINE

This compound is prepared as described in Example 9, Steps A and B, except that an equivalent quantity of the sodium salt of ethyl mercaptan is substituted for the sodium methoxide used in Step A. Thus, the products obtained in order are 3-amino-5-ethylthio-6-chloropyrazinamide, N,N - dimethyl - N' - (3 - cyano - 5 - chloro-6-methylthio - 2 - pyrazinyl)formamidine, - 3 - amino - 5-ethylthio - 6 - chloropyrazinonitrile and 2,4 - diamino-6-chloro-7-ethylthiopteridine.

EXAMPLE 13.—2,4-DIAMINO-6-CHLORO-7-HYDROXYPTERIDINE

Step A.—Preparation of 2,4-diamino-6,7-dichloropteridine

Sodium (0.46 g., 0.02 g. atom) is dissolved in tert.-butanol (100 ml.), guanidine hydrochloride (1.91 g., 0.02 mole) is added and the mixture is refluxed for 30 minutes and then filtered. The tert.-butanol is removed from the filtrate and the residual guanidine is treated with 3-amino-5,6-dichloropyrazinonitrile (3.78 g., 0.02 mole, from Example 4, Step C.). The reaction mixture is heated briefly at 60° C. to assure complete homogeneity and then stirred at room temperature for 2 hours. The addition of water (100 ml.) precipitates the product which is recovered by filtration, dried and purified by dissolving in dilute aqueous hydrochloric acid and precipitating with dilute aqueous sodium hydroxide. The product melts at >300° C.

Analysis.—Calculated for $C_6H_4N_6Cl_2$: C, 31.19%; H, 1.74%. Found: C, 31.53%; H, 2.09%.

Step B.—Preparation of 2,4-diamino-6-chloro-7-hydroxypteridine 2,4-diamino-6,7-dichloropteridine (2.31 g., 0.01 mole) is dissolved in dimethylformamide (50 ml.) and sodium acetate (902 gm., 0.011 mole) is added and the mixture stirred and heated on a steam bath for 2 hours. The solvent is removed by distillation at reduced pressure, the residue is suspended in water, 1 N sodium hydroxide (10 ml., 0.01 mole) is added and the mixture stirred and heated to effect solution. The solution is filtered and the filtrate acidified with acetic acid. The 2,4-diamino-6-chloro-7-hydroxypteridine that precipitates is removed by filtration, washed with water and dried.

EXAMPLE 14.—2,4-DIAMINO-6-CHLORO-7-MERCAPTOPTERIDINE

This compound is prepared as described in Example 13, Step B except that a mixture of sodium sulfide monohydrate (2.4 g., 0.01 mole) and sulfur (2.5 g.) in ethanol (20 ml.) which had been refluxed for 30 minutes is substituted for the sodium acetate and dimethylformamide.

EXAMPLE 15.—2,4-DIAMINO-6-CHLORO-7-BENZYLOXYPTERIDINE

This product is prepared in the same manner described in Example 8 except that benzyl alcohol is substituted for isopropyl alcohol.

This product also can be prepared by the method described in Example 9 by replacing the methanol used in Step A by an equivalent quantity of benzyl alcohol.

EXAMPLE 16.—2,4-DIAMINO-6-BROMO-7-PHENYLPTERIDINE

This product is prepared following the procedure of Example 1, Steps A through D, except the methyl 3-amino-6-chloropyrazinoate employed in Step A of Example 1 is replaced by an equimolecular quantity of methyl 3-amino-5-phenyl-6-bromopyrazinoate. By following the procedures described in Steps A through D of Example 1, there is produced successively 3-amino-5-phenyl - 6 - bromopyrazinamide, N,N - dimethyl - N'-(3-cyano - 5 - bromo - 6 - phenyl - 2 - pyrazinyl)formamidine, 3 - amino - 5 - phenyl - 6 - bromopyrazinonitrile and 2,4-diamino-6-bromo-7-phenylpteridine.

Other 2,4-diamino-6-halo-7-mononuclear aryl pteridine compounds also can be prepared by the procedures described in Example 1 by replacing the methyl 3-amino-6-chloropyrazinoate used in Step A of Example 1 by, inter alia, (a) Methyl 3-amino-5-p-tolyl-6-chloropyrazinoate or
(b) Methyl 3-amino - 5 - p - chlorophenyl - 6 - chloropyrazinoate in an equimolecular quantity thus forming successively in the case of substitution (a):

3-amino-5-p-tolyl-6-chloropyrazinamide,
N,N-dimethyl-N'-(3-cyano-6-chloro-6-p-tolyl-2-pyrazinyl)formamidine,
3-amino-5-p-tolyl-6-chloropyrazinamide,
2,4-diamino-6-chloro-7-p-tolylpteridine, and in the case of substitution (b):

3-amino-5-p-chlorophenyl-6-chloropyrazinamide,
N,N-dimethyl-N',(3cyano-5-chloro-6-p-chlorophenyl-2-pyrazinyl)formamidine,
3-amino-5-p-chlorophenyl-6-chloropyrazinonitrile, and
2,4-diamino-6-chloro-7-p-chlorophenylpteridine.

EXAMPLE 17.—2,4-DIAMINO-6-BROMO-7-METHYLPTERIDINE

This product is prepared following the procedure of Example 1, Steps A through D, except the methyl 3-amino-6-chloropyrazinoate employed in Step A of Example 1 is replaced by an equimolecular quantity of methyl-3-amino-5-methyl-6-bromopyrazinoate. By following the procedures described in Steps A through D of Example 1, there is produced successively 3-amino-5-methyl-6-bromopyraziminide, N,N - dimethyl-N'-(3-cyano-5-bromo-6-methyl-2-pyrazinyl) formamidine, 3-amino-5-methyl-6-bromopyrazinonitrile and 2,4-diamino-6-bromo-7-methylpetridine.

EXAMPLE 18.—2,4,7-TRIAMINO-6-CHLOROPTERIDINE

Step A.—Preparation of 3,5-diamino-6-chloropyrazinonitrile

A solution of 3-amino-5,6-dichloropyrazinonitrile, from Example 4, Step C, (10.0 g., 0.05 mole) in dimethyl sulfoxide (50 ml.) is stirred and heated on a steam bath while ammonia gas is admitted below the surface of the solution. The addition requires 30 minutes, after which the solution is cooled and poured into water (150 ml.). The solid that separates is removed by filtration, washed with water and dried yielding 5.1 g. (60%) of 3,5-diamino-6-chloropyrazinonitrile, M.P. 295° C. After recrystallization from water the melting point remains unchanged.

*Analysis.*—Calculated for $C_5H_4ClN_5$: C, 35.41%; H, 2.48%; N, 41.30%. Found: C, 35.69%; H, 2.30%; N, 41.10%.

Step B.—Preparation of 2,4,7-triamino-6-chloropteridine

Sodium (690 mg., 0.03 g. atom) is dissolved in isopropyl alcohol (100 ml.) then guanidine hydrochloride (2.86 g., 0.031 mole) is added and the mixture refluxed for 30 minutes. The mixture is cooled, filtered and 3,5-diamino-6-chloropyrazinonitrile (2.6 g., 0.015 mole) in isopropyl alcohol (300 ml.) is added to the filtrate. The solution is refluxed for an hour and cooled. The solid that separates is removed by filtration, washed with water and dried yielding 3.0 g. (92%) of 2,4,7-triamino-6-chloropteridine, M.P. >310° C. Purification was effected by dissolving in dilute aqueous hydrochloric acid followed by precipitation with dilute aqueous sodium hydroxide.

*Analysis.*—Calculated for $C_6H_6ClN_7$: C, 34.09%; H, 2.86%; N, 46.42%. Found: C, 34.03%; H, 3.16%; N, 46.35%.

EXAMPLE 19.—2,4,7-TRIAMINO-6-BROMOPTERIDINE

Step A.—Preparation of 3,5-diamino-6-bromopyrazinonitrile

This product is prepared by the method described in Example 18. Step A, by replacing the 3-amino-5,6-dichloropyrazinonitrile by an equimolecular quantiy of 3-amino-5-chloro-6-bromopyrazinonitrile, from Example 5, Step C.

Step B.—Preparation of 2,4,7-triamino-6-bromopteridine

This product is prepared as described in Example 18, Step B, by replacing the 3,5-diamino-6-chloropyrazinonitrile by an equimolecular quantity of 3,5-diamino-6-bromopyrazinonitrile.

EXAMPLE 20.—2,4,7-TRIAMINO-6-IODOPTERIDINE

Step A.—Preparation of 3,5-diaminopyrazinonitrile

A mixture of 3,5-diamino-6-chloropyrazinonitrile from Example 18, Step A, (11.9 g., 0.07 mole), 5% palladium-on-charcoal catalyst (9 g.), magnesium oxide (4.0 g., 0.1 mole) and methanol (250 ml. is shaken in an atmosphere of hydrogen for 18 hours at room temperature at an initial pressure of 30 p.s.i. The pressure drop indicates an absoption of 0.07 mole of hydrogen. The mixture is filtered and the solids extracted with a boiling solution of 2-propanol (500 ml.) and water (250 ml.). The methanol filtrate and the 2-propanol-water extract are united and concentrated to a volume of 50 ml. and cooled. The 3,5-diaminopyrazinonitrile that separates is removed by filtration, dried and recrysallized from a mixture of 2-propanol and water.

Step B.—Preparation of 3,5-diamino-6-iodopyrazidinonitrile

A suspension of 3,5-diaminopyrazinonitrile (13.4 g., 0.1 mole) in water (300 ml.) is heated to 70° C., then mercuric acetate (3.2 g., 0.1 mole) and a solution of iodine (25 g., 0.1 mole) in warm dioxane (200 ml. is added quickly. The mixture is stirred and heated on a steam bath for 5 minutes, then allowed to cool to room temperature and treated with an aqueous solution of potassium iodide (500 ml. containing 75 g. of potassium iodide). The red solution quickly deposits a crystalline product which is separated by filtration, dried and recrystallized from a mixture of 2-propanol and water.

Step C.—Preparation of 2,4,7-triamino-6-iodopteridine

This product is prepared as described in Example 18, Step B, by replacing the 3,5-diamino-6-chloropyrazinonitrile by an equimolecular quantity of 3,5-diamino-6-iodopyrazinonitrile.

EXAMPLE 21.—2,4-DIAMINO-6-CHLORO-7-ETHYLAMINOPTERIDINE

Step A.—Preparation of 3-amino-5-ethylamino-6-chrloropyrazinonitrile 3-amino-5,6-dichloropyrazinonitrile from Example 4, Step C, (5.0 g., 0.0265 mole) is dissolved in dimethyl sulfoxide (50 ml.) at 65° C., then 70% aqueous ethylamine (3.5 ml., 0.05 mole) is added and the solution stirred at this temperature for 15 minutes. After cooling it is poured into water (150 ml.) and the solid that separates is removed by filtering, washed with water and dried yielding 3.2 g. (62%) of product M.P. 100–105° C. After recrystallization from a mixture of water and isopropyl alcohol, the 3-amino-5-ethylamino-6-chloropyarzinonitrile melts at 107–109° C.

Analysis.—Calculated for $C_7H_8ClN_5$: C, 42.55%; H, 4.14%; N, 35.45%. Found: C, 42.21%; H, 3.92%; N, 35.34%.

Step B.—Preparation of 2,4-diamino-6-chloro-7-ethylaminopteridine

Sodium (460 mg., 0.02 g. atom) is dissolved in isopropyl alcohol (50 ml.). Then guanidine hydrochloride (1.91 g., 0.02 mole) is added and the mixture refluxed for 30 minutes. The mixture is cooled, filtered and then 3-amino-5-ethylamino-6-chloropyrazinonitrile (2.0 g., 0.01 mole) is added to the filtrate. The mixture is refluxed for an hour and cooled. The solid that separates is removed by filtration, washed with water and dried yielding 1.9 g. (78%) of 2,4-diamino-6-chloro-7-ethylaminopteridine, M.P. 256–259° C. After recrystallization from ethanol the melting point of the product remains unchanged.

Analysis.—Calculated for $C_8H_{10}ClN_7$: C, 40.10%; H, 4.21%; N, 40.90%. Found: C, 40.12%; H, 4.17%; N, 40.69%.

EXAMPLE 22.—2,4-DIAMINO-6-CHLORO-7-ANILINOPTERIDINE

Step A.—Preparation of 3-amino-5-anilino-6-chloropyrazinonitrile

A solution of 3-amino-5,6-dichloropyrazinonitrile, from Example 4, Step C (10 g., 0.053 mole), aniline (14.9 g., 0.16 mole), aniline hydrochloride (13.7 g., 0.116 mole) and dimethyl sulfoxide (100 ml.) is heated at 65° C. for 3 hours and then cooled and diluted with water (100 ml.). The solid that separates is removed by filtration, washed with water, dried and washed with methylcyclohexane. After recrystallization from isopropyl alcohol there is obtained 3-amino-5-anilino-6-chloropyrazinonitrile.

Step B.—Preparation of 2,4-diamino-6-chloro-7-anilinopteridine

This product is prepared by substantially the same procedure described in Example 21, Step B, except the 3-amino-5-ethylamino-6-chloropyrazinonitrile used there is replaced by an equimolecular quantity of 3-amino-5-anilino-6-chloropyrazinonitrile.

EXAMPLE 23.—2,4-DIAMINO-6-CHLORO-7-p-METHYLANILINOPTERIDINE

Step A.—Preparation of 3-amino-5-p-methylanilino-6-chloropyrazinonitrile

This product is prepared by the process described in Example 22, Step A, except the aniline and the aniline hydrochloride employed there are replaced by equimolecular quantities of p-toluidine and p-toluidine hydrochloride respectively.

Step B.—Preparation of 2,4-diamino-6-chloro-7-p-methylanilinopteridine

This product is prepared following substantially the same procedure described in Example 21, Step B, except the 3-amino-5-ethylamino - 6 - chloropyrazinonitrile used there is replaced by an equimolecular quantity of 3-amino-5-p-methylanilino-6-chloropyrazinonitrile.

EXAMPLE 24.—2,4-DIAMINO-6-CHLORO-7-p-CHLOROANILINOPTERIDINE

Step A.—Preparation of 3-amino-5-p-chloroanilino-6-chloropyrazinonitrile

This product is prepared by the process described in Example 22, Step A, except the aniline and the aniline hydrochloride employed there are replaced by equimolecular quantities of p-chloroaniline and p-chloroaniline hydrochloride respectively.

Step B.—Preparation of 2,4-diamino-6-chloro-7-p-chloroanilinopteridine

This product is prepared following substantially the same procedure described in Eample 21, Step B, except the 3-amino-5-ethylamino-6-chloropyrazinonitrile used there is replaced by an equimolecular quantity of 3-amino-5-p-chloroanilino-6-chloropyrazinonitrile.

Table A identifies other 2,4-diamino - 6 - chloro-7-$RR^1N$-pteridines prepared by the process described in Example 21, Steps A and B, except the ethylamine used in Example 21, Step A, is replaced by an equimolecular quantity of the $RR^1NH$ identified in the table. The variable radicals R and $R^1$ of the amine reactant remain unchanged during the reaction and are the same in the 5-position $RR^1N$-groups of the intermediate pyrazinonitrile (A) and pyrazinimidoylguanidine (B) and in the 7-position $RR^1N$-groups of the pteridine end product (C) and are identified in the columns headed R and $R^1$ in Table A.

TABLE A

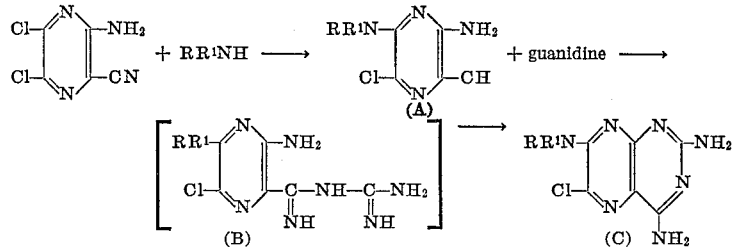

| Ex. No. | R | $R^1$ | | Percent Yield | M.P., °C. | Calculated | | | Found | | |
|---|---|---|---|---|---|---|---|---|---|---|---|
| | | | | | | C | H | N | C | H | N |
| 25 | Isopropyl | H | Pyrazinonitrile (A) | 92 | 126–8 | 45.46 | 4.76 | 33.12 | 44.81 | 4.81 | 33.35 |
| | | | Pteridine (C) | 79 | 233–5 | 42.60 | 4.77 | 38.65 | 42.84 | 4.65 | 38.70 |
| 26 | Allyl | H | Pyrazinonitrile (A) | 56 | 103–5 | 45.79 | 3.85 | 33.42 | 46.01 | 3.89 | 33.56 |
| | | | Pteridine (C) | 83 | 245–7 | 42.92 | 4.00 | 38.96 | 43.21 | 4.03 | 38.74 |
| 27 | Methyl | Methyl | Pyrazinonitrile (A) | 79 | 119–20 | 42.55 | 4.14 | 35.45 | 42.68 | 4.10 | 35.62 |
| | | | Pteridine (C) | 66 | [1] 263 | 40.10 | 4.21 | 40.90 | 40.32 | 4.22 | 40.86 |
| 28 | Ethyl | Ethyl | Pyrazinonitrile (A) | 70 | 114–6 | 47.90 | 5.36 | 31.05 | 47.98 | 5.36 | 31.24 |
| | | | Pteridine (C) | 84 | [1] 268–71 | 44.95 | 5.28 | 36.67 | 45.13 | 5.38 | 36.48 |
| 29 | 2-dimethylaminoethyl | H | Pyrazininitrile (A) | 62 | 135–7 | 44.91 | 5.44 | | 44.91 | 5.29 | |
| | | | Pteridine (C) | 50 | [1] 190–2 | 42.48 | 5.35 | | 42.72 | 5.29 | |

[1] Decomposed.

Other 2,4-diamino-6-chloro-7(substituted-amino)-pteridine compounds that are prepared by the procedures described in Example 21, Steps A and B, are identified in the following table. In each example the 3-amino-5,6-dichloropyrazinonitrile is heated with the required amine $RR^1NH$ at 50° C. to 100° C. for 10 to 30 minutes in a solvent such as dimethyl sulfoxide, dimethylformamide or ethanol to produce the corresponding 3-amino-5-$NRR^1$-pyrazinonitrile which is refluxed with a 2-propanol solution of guanidine to produce the corresponding 2,4-diamino-6-chloro-7-$NRR^1$-pteridine according to the procedure described in Example 21.

The following table identifies other 2,4-diamino-6-chloro-7-(substituted-amino)-pteridines that are representative of the products that are and can be prepared by substituting equivalent quantities of the appropriate amine for ethylamine employed in Example 21, Step A, and of the corresponding 3-amino-5-substituted aminopyrazinonitrile for the 3-amino-5-ethylaminopyrazinonitrile in Example 21, Step B.

TABLE B-1

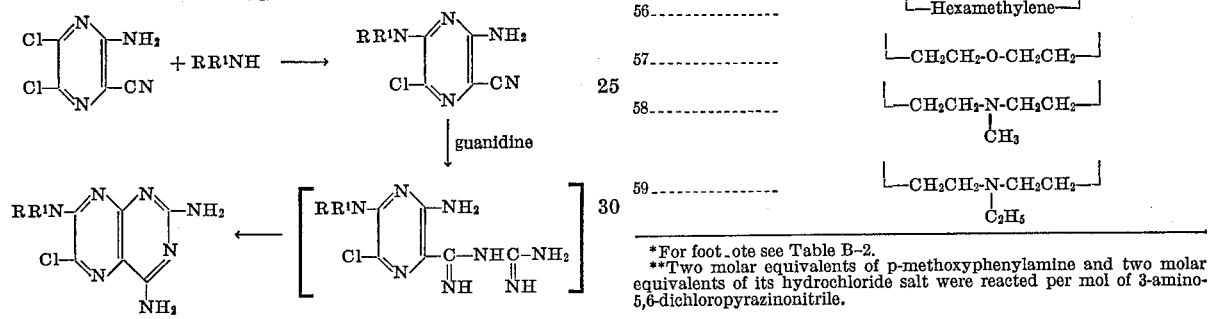

| Example No. | $R^1$ | R |
|---|---|---|
| 30 | Methyl | Hydrogen. |
| 31 | Cyclopropylmethyl | Do. |
| 32 | 2,2,2-trifluoro-ethyl | Do. |
| 33 | 2-hydroxyethyl | Do. |
| 34 | 2-methoxyethyl | Do. |
| 35 | Benzyl | Do. |
| 36 | p-methylbenzyl | Do. |
| 37 | p-methoxybenzyl | Do. |
| 38 | p-chlorobenzyl | Do. |
| 39 | 2-furylmethyl | Do. |
| 40 | 2-imidazolin-2-yl-methyl | Do. |
| 41 | 2-pyridylmethyl | Do. |
| 42 | 3-pyridylmethyl | Do. |
| 43 | 4-pyridylmethyl | Do. |
| 44 | Cyclobutyl | Do. |
| 45 | Propargyl | Do. |
| 46 | Methoxy | Do. |
| 47 | Acetamidino* | Do. |
| 48 | Benzamidino* | Do. |
| 49 | N,N-dimethylamidino | Do. |
| 50 | N-methyl-N-ethylamidino | Do. |
| 51 | 2-imidazolin-2-yl | Do. |
| 52 | p-Methoxyphenyl** | Do. |
| 53 | Methyl | Allyl. |
| 54 | Propyl | Butyl. |
| 55 | —Tetramethylene— | |
| 56 | —Hexamethylene— | |
| 57 | —$CH_2CH_2$-O-$CH_2CH_2$— | |
| 58 | —$CH_2CH_2$-N-$CH_2CH_2$—  $CH_3$ | |
| 59 | —$CH_2CH_2$-N-$CH_2CH_2$—  $C_2H_5$ | |

*For footnote see Table B-2.
**Two molar equivalents of p-methoxyphenylamine and two molar equivalents of its hydrochloride salt were reacted per mol of 3-amino-5,6-dichloropyrazinonitrile.

TABLE B-2

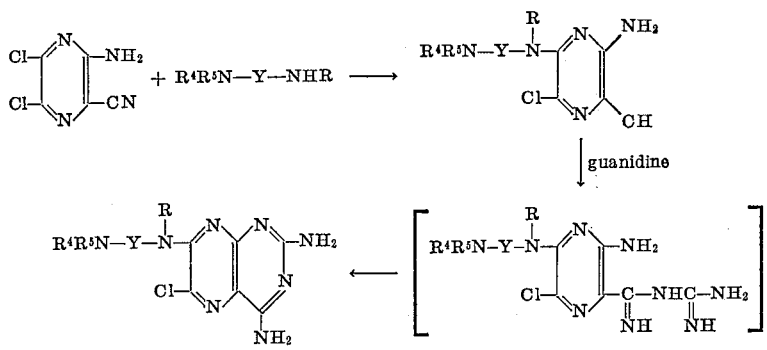

| Example No. | $R^5$ | $R^4$ | R | Y |
|---|---|---|---|---|
| 60 | Acetyl* | Hydrogen | Hydrogen | —$CH_2CH_2$— |
| 61 | Benzoyl* | do | do | —$CH_2$—$CH_2$— |
| 62 | Propyl | do | do | —$CH_2$—$CH_2$— |
| 63 | Cyclopentylmethyl | do | do | —$CH_2CH_2$— |
| 64 | Benzyl | do | do | —$CH_2CH_2$— |
| 65 | Acetamidino* | do | do | —$CH_2CH_2$— |
| 66 | N,N-dimethylamidino | do | do | —$CH_2CH_2$— |
| 67 | N,N-diethylamidino | do | do | —$CH_2CH_2$— |
| 68 | N-methyl-N-ethylamidino | do | do | —$CH_2CH_2$— |
| 69 | 2-imidazolin-2-yl | do | do | —$CH_2CH_2$— |
| 70 | Pyrrolidyl | do | do | —$CH_2CH_2$— |
| 71 | Methyl | Methyl | do | —$CH_2CH_2$— |
| 72 | Allyl | do | do | —$CH_2CH_2$— |
| 73 | Propargyl | do | do | —$CH_2CH_2$— |
| 74 | Cyclohexyl | do | do | —$CH_2CH_2CH_2$— |
| 75 | 2-hydroxyethyl | do | do | —$CH_2CH_2$— |
| 76 | 2-methoxyethyl | do | do | —$CH_2CH_2$— |
| 77 | Benzyl | do | do | —$CH_2CH_2$— |
| 78 | p-Methoxybenzyl | do | do | —$CH_2CH_2$— |
| 79 | m-Chlorobenzyl | do | do | —$CH_2CH_2$— |
| 80 | 3-(o-bromophenyl)-propyl | do | do | —$CH_2CH_2$— |
| 81 | 3-(p-methoxyphenyl)-propyl | do | do | —$CH_2CH_2$— |
| 82 | 2-phenylpropyl | do | do | —$CH_2CH_2$— |
| 83 | 2-dimethylaminoethyl | do | do | —$CH_2CH_2$— |
| 84 | Tetrahydrofurfuryl | do | do | —$CH_2CH_2$— |
| 85 | 2-benzofuranylmethyl | do | do | —$CH_2CH_2CH_2$— |

TABLE B-2—Continued

| Example No. | R³ | R⁴ | R | Y |
|---|---|---|---|---|
| 86 | do | Ethyl | do | —CH₂CH₂CH₂— |
| 87 | 2,3-dihydro-2-benzofuranylmethyl | Methyl | do | —CH₂CH₂CH₂— |
| 88 | do | Ethyl | do | —CH₂CH₂CH₂— |
| 89 | Phenyl | Methyl | do | —CH₂CH₂— |
| 90 | Phenyl | Ethyl | do | —CH₂CH₂— |
| 91 | m-Tolyl | Methyl | do | —CH₂CH₂— |
| 92 | p-Tolyl | Ethyl | do | —CH₂CH₂— |
| 93 | 2,6-dimethylphenyl | Ethyl | do | —CH₂CH₂— |
| 94 | do | Methyl | do | —CH₂CH₂— |
| 95 | Ethyl | Ethyl | do | —CH₂CH₂— |
| 96 | Methyl | Butyl | do | —CH₂CH₂— |
| 97 | Methyl* | Acetyl | do | —CH₂CH₂— |
| 98 | Ethyl* | do | do | —CH₂CH₂— |
| 99 | Isopropyl* | do | do | —CH₂CH₂— |
| 100 | 1,4-benzodioxan-6-yl | Methyl | do | —CH₂CH₂— |
| 101 | Hydrogen | Acetyl | do | —CH₂HC₂CH₂— |
| 102 | Methyl | Methyl | do | —CH₂CH₂CH₂— |
| 103 | Ethyl | Ethyl | do | —CH₂CHOH—CH₂— |
| 104 | Methyl | Methyl | do | —CH₂CH₂CH₂—CH₂— |
| 105 | Ethyl | Ethyl | Methyl | —CH₂CH₂— |
| 106 | Methyl | Methyl | do | —CH₂CH₂CH₂— |
| 107 | ⌞— Tetramethylene —⌟ | | Hydrogen | —CH₂CH₂— |
| 108 | ⌞— Pentamethylene —⌟ | | do | —CH₂CH₂— |
| 109 | ⌞— Pentamethylene —⌟ | | do | —CH₂CH₂CH₂— |
| 110 | ⌞— CH₂CH₂—N(COCH₃)—CH₂CH₂ —⌟ | | do | —CH₂CH₂— |
| 111 | ⌞— CH₂CH₂—N(CH₃)—CH₂CH₂* —⌟ | | do | —CH₂CH₂— |
| 112 | ⌞— CH₂CH₂—N(CH₃)—CH₂CH₂ —⌟ | | do | CH₂CH₂CH₂— |
| 113 | ⌞— CH₂CH₂—O—CH₂CH₂ —⌟ | | do | —CH₂CH₂— |
| 114 | ⌞— CH₂CH₂—O—CH₂CH₂ —⌟ | | do | —CH₂CH₂CH₂— |

*Hydrolysis with 6 NHCl gives the following des-acylated product:

Example 47(a)—2,4-diamino-6-chloro-7-guanidinopteridine.
Example 48(a)—Same as 47(a).
Example 60(a)—2,4-diamino-6-chloro-7-(2-aminoethylamino)pteridine.
Example 61(a)—Same as 60(a).
Example 65(a)—2,4-diamino-6-chloro-7-(2-guanidinoethylamino)pteridine.
Example 97(a)—2,4-diamino-6-chloro-7-(2-methylaminoethylamino)pteridine.
Example 98(a)—2,4-diamino-6-chloro-7-(2-ethylaminoethylamino)pteridine.
Example 99(a)—2,4-diamino-6-chloro-7-(2-isopropylaminoethylamino)pteridine.
Example 101(a)—2,4-diamino-6-chloro-7-(3-aminopropylamino)pteridine.
Example 110(a)—2,4-diamino-6-chloro-7-[2-(1-piperazinyl)ethyl]pteridine.

What is claimed is:
1. 2,4-diamino-6-halo-7-X-pteridine wherein the 6-halo is selected from the group consisting of chloro, bromo and iodo and X is selected from hydrogen, chloro, bromo, hydroxy, lower alkoxy, phenyl-lower alkoxy, mercapto, lower alkylthio, phenyl-lower alkylthio, lower alkyl, phenyl, lower alkylphenyl, halophenyl, and

wherein R is selected from the group consisting of hydrogen, lower alkyl and lower alkenyl, and R¹ is selected from hydrogen, amidino [of the structure R²R³N—C(=NH)— wherein R² is selected from the group consisting of hydrogen and lower alkyl and R³ is selected from the group consisting of hydrogen, lower alkyl, lower alkanoyl and benzoyl], 2-imidazolin-2-yl, lower alkoxy, lower cycloalkyl, lower alkenyl, lower alkynyl, lower alkyl, halo-lower alkyl, hydroxy-lower alkyl, lower alkoxy-lower alkyl, lower cycloalkyl-lower alkyl, phenyl-lower alkyl, (lower alkyl substituted phenyl)-lower alkyl, (halophenyl)-lower alkyl, (lower alkoxyphenyl)-lower alkyl, furyl-lower alkyl, tetrahydrofuryl-lower alkyl, pyridyl-lower alkyl, 2-imidazolin-2-yl-lower alkyl, piperazinyl-lower alkyl, 4-lower alkyl-piperazinyl-lower alkyl, pyrrolidyl-lower alkyl, morpholino-lower alkyl, R⁴R⁵N-lower alkyl [wherein R⁴ is selected from the group consisting of hydrogen, lower alkyl, lower alkenyl, lower alkanoyl and benzoyl, and R⁵ is selected from the group consisting of hydrogen, amidino (of structure R²R³N—C(=NH)— wherein R² and R³ have the meaning given above), 2-imidazolin-2-yl, 1,4-benzodioxan-6-yl, phenyl, halophenyl, lower alkylphenyl, lower alkoxyphenyl, lower alkenyl, lower alkynyl, lower cycloalkyl, lower alkyl, lower (dialkyaminoalkyl), hydroxyalkyl, lower-alkoxyalkyl, lower cycloalkylalkyl, phenyl-lower alkyl, halophenyl-lower alkyl, lower (alkoxyphenylalkyl), lower (alkylphenylalkyl), furyl-lower alkyl, tetrahydrofuryl-lower alkyl, pyridyl-lower alkyl, 2-imidazolin-2-yl-lower alkyl, piperidino-lower alkyl, piperazinyl-lower alkyl, 4 - lower alkylpiperazinyl-lower alkyl, morpholino-lower alkyl, pyrrolidyl-lower alky, 2-benzofuranyl-lower alkyl, 2,3-dihydro-2-benzofuranyl - lower alkyl, lower alkanoyl, benzoyl, and when R⁴ and R⁵ are alkyl they can be joined together directly or through an N or O hetero atom to form a 5 or 6 membered ring with the nitrogen atom to which they are attached], phenyl, lower alkylphenyl, lower alkoxyphenyl, halophenyl, and when R and R¹ are alkyl they can be joined together directly or through an N or O hetero atom to form a 5 or 6 membered ring with the nitrogen to which they are attached.

2. 2,4-diamino-6-halopteridine wherein the 6-position halo substituent is selected from chloro, bromo, and iodo.

3. A product as claimed in claim 2, wherein the 6-halo substituent is 6-chloro.

4. A product as claimed in claim 2, wherein the 6-halo substituent is 6-bromo.

5. A product as claimed in claim 2, wherein the 6-halo substituent is 6-iodo.

6. 2,4-diamino-6,7-dihalopteridine wherein the halo radicals are separately selected from chloro and bromo.

7. A product as claimed in claim 6, wherein the substituents in the 6- and 7-positions are each chloro.

8. A product as claimed in claim 6, wherein the 6-position halo is chloro and the 7-position halo is bromo.

9. A product as claimed in claim 6, wherein each of the halo substitutents in the 6- and 7-positions is bromo.

10. A product as claimed in claim 6, wherein the 6-halo substituent is bromo and the 7-halo substituent is chloro.

11. 2,4-diamino-6-halo-7-(NR¹R)-pteridine wherein R is selected from the group consisting of hydrogen, lower alkyl and lower alkenyl, and R¹ is selected from the group consisting of (a) hydrogen, (b) lower alkyl, (c) lower alkenyl, (d) lower alkynyl, (e) lower alkoxy, (f) phenyl, (g) halophenyl, (h) lower alkylphenyl, (i) lower alkoxyphenyl, (j) phenyl-lower alkyl, (k) lower (alkylphenylalkyl), (l) lower (alkoxyphenylalkyl), (m) halophenyl-lower alkyl, (n) ω,ω,ω-trifluorolower alkyl, (o) cycloalkyl having 3–6 nuclear carbons, (p) cycloalkyl-loweralkyl having 3–6 nuclear carbons in the cycloalkyl moiety, (q) hydroxy-lower alkyl, (r) lower (alkoxyalkyl), (s) pyridyl-lower alkyl, (t) furyl-lower alkyl, (u) tetrahydrofuryl-lower alkyl, (v) 2-imidazolin-2-yl-lower alkyl, (w) piperazinyl-lower alkyl, (x) 4-lower alkylpiperazinyl-lower alkyl, (y) pyrrolidyl-lower alkyl, (z) morpholino-lower alkyl; and when R and R¹ are alkyl, they can be linked together directly or through an N or O hetero atom to form a 5 or 6 membered ring with the nitrogen to which they are attached and the 6-halo substituent is selected from the group consisting of (a) chloro, (b) bromo, and (c) iodo.

12. A product as claimed in claim 11, wherein R=R¹= hydrogen.

13. A product as claimed in claim 11, wherein R=R¹= hydrogen, and the 6-halo substituent is chloro.

14. A product as claimed in claim 11, wherein R=R¹= hydrogen, and the 6-halo substituent is bromo.

15. A product as claimed in claim 11, where R is hydrogen, R¹ is lower aliphatic, and the 6-halo substituent is chloro.

16. A product as claimed in claim 11, wherein R is hydrogen, R¹ is ethyl, and the 6-halo substituent is chloro.

17. A product as claimed in claim 11, wherein R is hydrogen, R¹ is isopropyl, and the 6-halo substituent is chloro.

18. A product as claimed in claim 11, wherein R is hydrogen, R¹ is allyl, and the 6-halo substituent is chloro.

19. A product as claimed in claim 11, wherein R and R¹ respectively is lower alkyl, and the 6-halo substituent is chloro.

20. A product as claimed in claim 11, wherein R=R¹= methyl, and the 6-halo substituent is chloro.

21. A product as claimed in claim 11, wherein R=R¹= ethyl, and the 6-halo substituent is chloro.

22. A product as claimed in claim 11, wherein R is hydrogen, R¹ is phenyl, and the 6-halo substituent is chloro.

23. A product as claimed in claim 11, wherein R is hydrogen, R¹ is lower alkoxy, and the 6-halo substituent is chloro.

24. A product as claimed in claim 11, wherein R is hydrogen, R¹ is methoxy, and the 6-halo substituent is chloro.

25. A product as claimed in claim 11, wherein R is hydrogen, R¹ is hydroxyalkyl, and the 6-halo substituent is chloro.

26. A product as claimed in claim 11, wherein R is hydrogen, R¹ is 2-hydroxyethyl, and the 6-halo substituent is chloro.

27. A product as claimed in claim 11, wherein R is hydrogen, R¹ is phenyl-lower alkyl, and the 6-halo substituent is chloro.

28. A product as claimed in claim 11, wherein R is hydrogen, R¹ is benzyl, and the 6-halo substituent is chloro.

29. A product as claimed in claim 11, wherein R is hydrogen, R¹ is 2-furylmethyl, and the 6-halo substituent is chloro.

30. A product as claimed in claim 11, wherein R is hydrogen, R¹ is 4-pyridylmethyl, and the 6-halo substituent is chloro.

31. 2,4-diamino-6-halo-7-(RY)-pteridine wherein the 6-halo substituent is selected from chloro, bromo, and iodo, R is selected from hydrogen, lower alkyl and phenyl-lower alkyl, and Y is selected from oxygen and sulfur.

32. A product as claimed in claim 31, wherein the 6-halo substituent is chloro and 7-RY is 7-lower alkoxy.

33. A product as claimed in claim 31, wherein the 6-halo substituent is chloro and 7-RY is 7-methoxy.

34. A product as claimed in claim 31, wherein the 6-halo substituent is chloro, and 7-RY is 7-ethoxy.

35. A product as claimed in claim 31, wherein the 6-halo substituent is chloro, and 7-RY is 7-isopropoxy.

36. A product as claimed in claim 31, wherein the 6-halo substituent is bromo, and 7-RY is 7-isopropoxy.

37. A product as claimed in claim 31, wherein the 6-halo substituent is iodo, and 7-RY is 7-methoxy.

38. A product as claimed in claim 31, wherein the 6-halo substituent is chloro, and 7-RY is 7-benzyloxy.

39. A product as claimed in claim 31, wherein the 6-halo substituent is chloro, and 7-RY is 7-lower alkylthio.

40. A product as claimed in claim 31, wherein the 6-halo substituent is chloro, and 7-RY is 7-methylthio.

41. A product as claimed in claim 31, wherein the 6-halo substituent is bromo, and 7-RY is 7-ethylthio.

42. A product as claimed in claim 31, wherein 7-RY is 7-hydroxy.

43. A product as claimed in claim 31, wherein the 6-halo substituent is chloro, and 7-RY is 7-hydroxy.

44. A product as claimed in claim 31, wherein 7-RY is 7-mercapto.

45. A product as claimed in claim 31, wherein the 6-halo substituent is chloro, and 7-RY is 7-mercapto.

46. A product as claimed in claim 31, wherein the 6-halo substituent is chloro, and 7-RY is 7-benzylthio.

47.

2,4-diamino-6-halo-7-$\left(R^4R^5N-Y-\overset{R}{\underset{|}{N}}\right)$-pteridine wherein halo is selected from the group consisting of chloro, bromo and iodo, Y is lower alkylene, R is selected from the group consisting of hydrogen, lower alkyl and lower alkenyl, R⁴ is selected from the group consisting of hydrogen, lower alkyl, lower alkenyl, lower alkanoyl and benzoyl, and R⁵ is selected from the group consisting of hydrogen, amidino [of structure R²R³N—C(=NH)— wherein R² is selected from the group consisting of hydrogen and lower alkyl and R³ is selected from the group consisting of hydrogen, lower alkyl, lower alkanoyl and benzoyl], 2-imidazolin-2-yl, 1,4-benzodioxan-6-yl, phenyl, halophenyl, lower alkylphenyl, lower alkoxyphenyl, lower alkenyl, lower alkynyl, lower cycloalkyl lower alkyl, lower (dialkylaminoalkyl), hydroxyalkyl, lower alkoxyalkyl, lower cycloalkylalkyl, phenyl-lower alkyl, halo-pehnyl-lower alkyl, lower (alkoxyphenylalkyl), lower (alkylphenylalkyl), furyl-lower alkyl, tetrahydrofuryl-lower alkyl, pyridyl-lower alkyl, 2-imidazolin-2-yl-lower alkyl, piperidino-lower alkyl, piperazinyl-lower alkyl, 4-lower alkylpiperazinyl-lower alkyl, morpholino-lower alkyl, pyrrolidyl-lower alkyl, 2-benzofuranyl-lower alkyl, 2,3-dihydro-2-benzofuranyl-lower alkyl, lower alkanoyl, benzoyl, and when $R^4$ and $R^5$ are alkyl they can be joined together directly or through an N or O hetero atom to form a 5 or 6 membered ring with the nitrogen atom to which they are attached.

48. A product as claimed in claim 47 wherein R, $R^4$ and $R^5$ respectively is hydrogen.

49. A product as claimed in claim 48 wherein the 6-halo substituent is chloro and Y is —$CH_2CH_2$—.

50. A product as claimed in claim 47 wherein R is hydrogen and $R^4$ and $R^5$ respectively is a lower arkyl group.

51. A product as claimed in claim 47 wherein R is hydrogen and $R^4$ and $R^5$ respectively is a lower alkyl —$CH_2CH_2$— and 6-halo is chloro.

52. A product as claimed in claim 47 wherein R and $R^4$ respectively is hydrogen and $R^5$ is lower alkyl.

53. A product as claimed in claim 52 wherein the 6-halo substitutent is chloro.

54. A product as claimed in claim 47 wherein R and $R^4$ respectively is hydrogen, $R^5$ is methyl, Y is —$CH_2CH_2$— and 6-halo is 6-chloro.

55. A product as claimed in claim 47 wherein R and $R^4$ respectively is hydrogen, $R^5$ is amidino, and Y is —$CH_2CH_2$—.

56. A product as claimed in claim 55 wherein the 6-halo substituent is chloro.

57. A product as claimed in claim 47 wherein R and $R^4$ respectively is hydrogen, $R^5$ is 2-imidazolin-2-yl, Y is —$CH_2CH_2$— and 6-halo is 6-chloro.

58. A product as claimed in claim 11 wherein the 6-halo substituent is chloro and the 7-$NR^1R$ substituent is guanidino.

59. A product as claimed in claim 11 wherein the 6-halo substituent is chloro and the 7-$NR^1R$ substituent is 2-imidazolin-2-ylamino.

60. A process wherein 3-amino-5-X-6-halopyrazinonitrile and guanidine are caused to react at between ambient and reflux temperature to form 2,4-diamino-6-halo-7-X-pteridine wherein in each of the foregoing products halo and X have the meaning asigned to them in claim 1.

61. A process wherein a 3-amino-5-Y-6-halopyrazinonitrile, wherein Y is selected from chloro and bromo, and guanidine are reacted at between ambient and reflux temperature in the presence of an alkanol selected from a lower primary alkanol and a lower secondary alkanol to give 2,4-diamino-6-halo-7-lower alkoxypteridine.

References Cited

UNITED STATES PATENTS

| 2,667,486 | 1/1954 | Cain | 260—251.5 |
| 2,940,972 | 6/1960 | Roch | 260—247.5 |

ALEX MAZEL, Primary Examiner

R. V. RUSH, Assistant Examiner

U.S. Cl. X.R.

260—247.1, 247.2, 247.5, 250; 424—248, 251